(12) United States Patent
Dandage et al.

(10) Patent No.: US 12,345,733 B2
(45) Date of Patent: Jul. 1, 2025

(54) ROTARY MECHANISM WITH ADJUSTABLE TONE WHEEL

(71) Applicant: DEERE & COMPANY, Moline, IL (US)

(72) Inventors: Ramesh Krishna Dandage, Ichalkaranji (IN); Bhuvan Kothari, Indore (IN); Brent R. Gernant, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 1078 days.

(21) Appl. No.: 17/301,821

(22) Filed: Apr. 15, 2021

(65) Prior Publication Data
US 2022/0333627 A1    Oct. 20, 2022

(51) Int. Cl.
*G01P 3/481*    (2006.01)
*G01P 3/48*    (2006.01)

(52) U.S. Cl.
CPC ....... *G01P 3/481* (2013.01); *Y10T 403/32451* (2015.01)

(58) Field of Classification Search
None
See application file for complete search history.

(56) References Cited

U.S. PATENT DOCUMENTS

| | | | |
|---|---|---|---|
| 5,143,467 A * | 9/1992 | Gardner | F16B 5/0642 403/388 |
| 10,941,798 B2 * | 3/2021 | Ramsauer | F16B 5/0635 |
| 11,639,749 B1 * | 5/2023 | Nejah | B62M 25/08 474/56 |
| 2005/0192136 A1 * | 9/2005 | Allard | F16H 55/54 474/47 |

FOREIGN PATENT DOCUMENTS

| | | | | |
|---|---|---|---|---|
| CN | 104648596 A | * | 5/2015 | ............. B62M 6/45 |
| DE | 19944019 A1 | * | 3/2000 | ............. G01B 7/30 |
| EP | 1918605 B1 | | 7/2009 | |
| JP | H11242042 A | | 9/1999 | |
| JP | 2000081445 A | | 3/2000 | |
| WO | WO 03/040730 A1 | | 5/2003 | |

* cited by examiner

*Primary Examiner* — Jill E Culler
*Assistant Examiner* — Ruben C Parco, Jr.

(57) ABSTRACT

A rotary mechanism comprises a fastener and a tone wheel. The tone wheel comprises a first radial flange, a second radial flange, a first target, and a second target. The first and second targets mounted respectively to the first and second radial flanges to be sensed by a sensor. Each of the first radial flange and the second radial flange comprises a plurality of mounting points, the plurality of mounting points of the first radial flange and the second radial flange provided for adjustment of a diameter of the tone wheel. The fastener is provided to mount the first radial flange and the second radial flange to a shaft at a selected mounting point among the plurality of mounting points of each of the first radial flange and the second radial flange to set the diameter of the tone wheel. An associated method is disclosed.

2 Claims, 6 Drawing Sheets

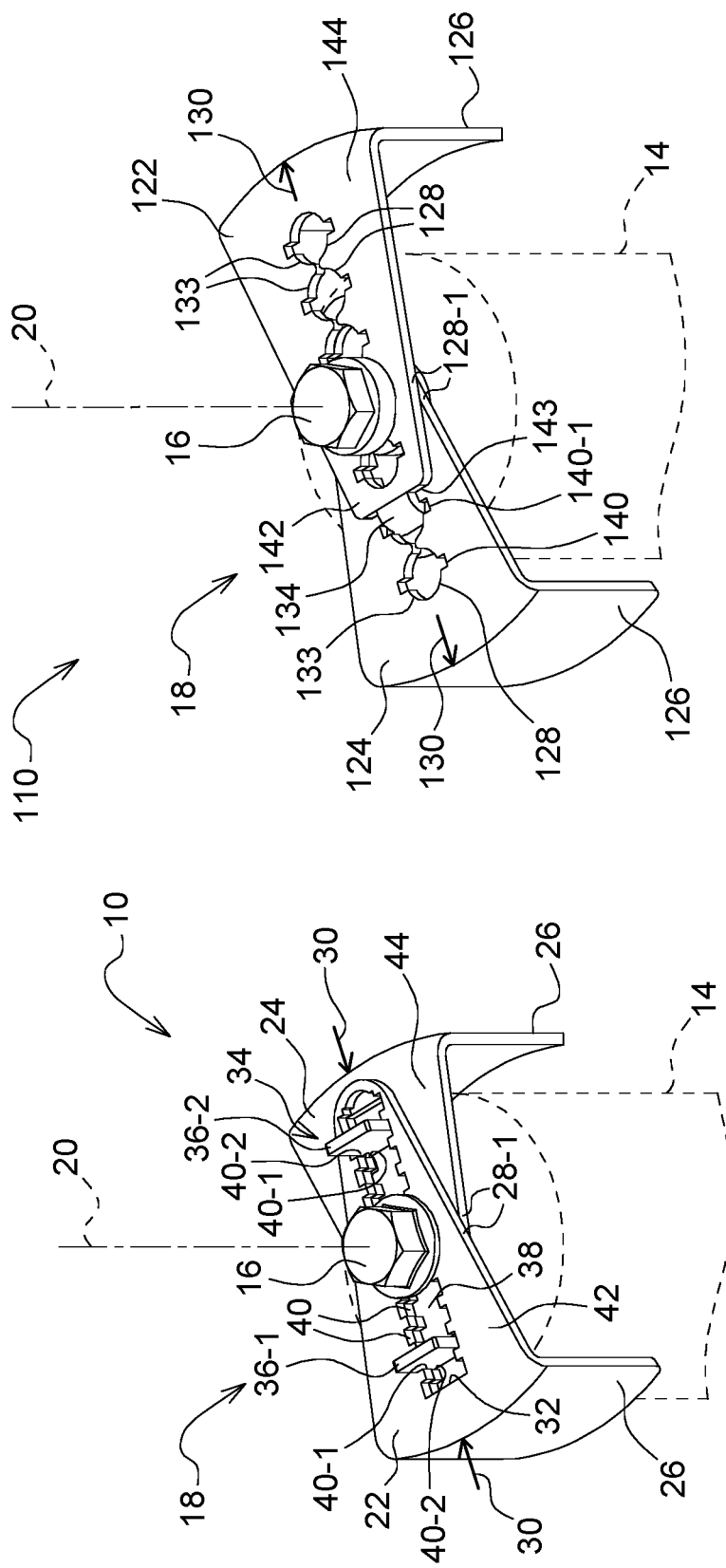

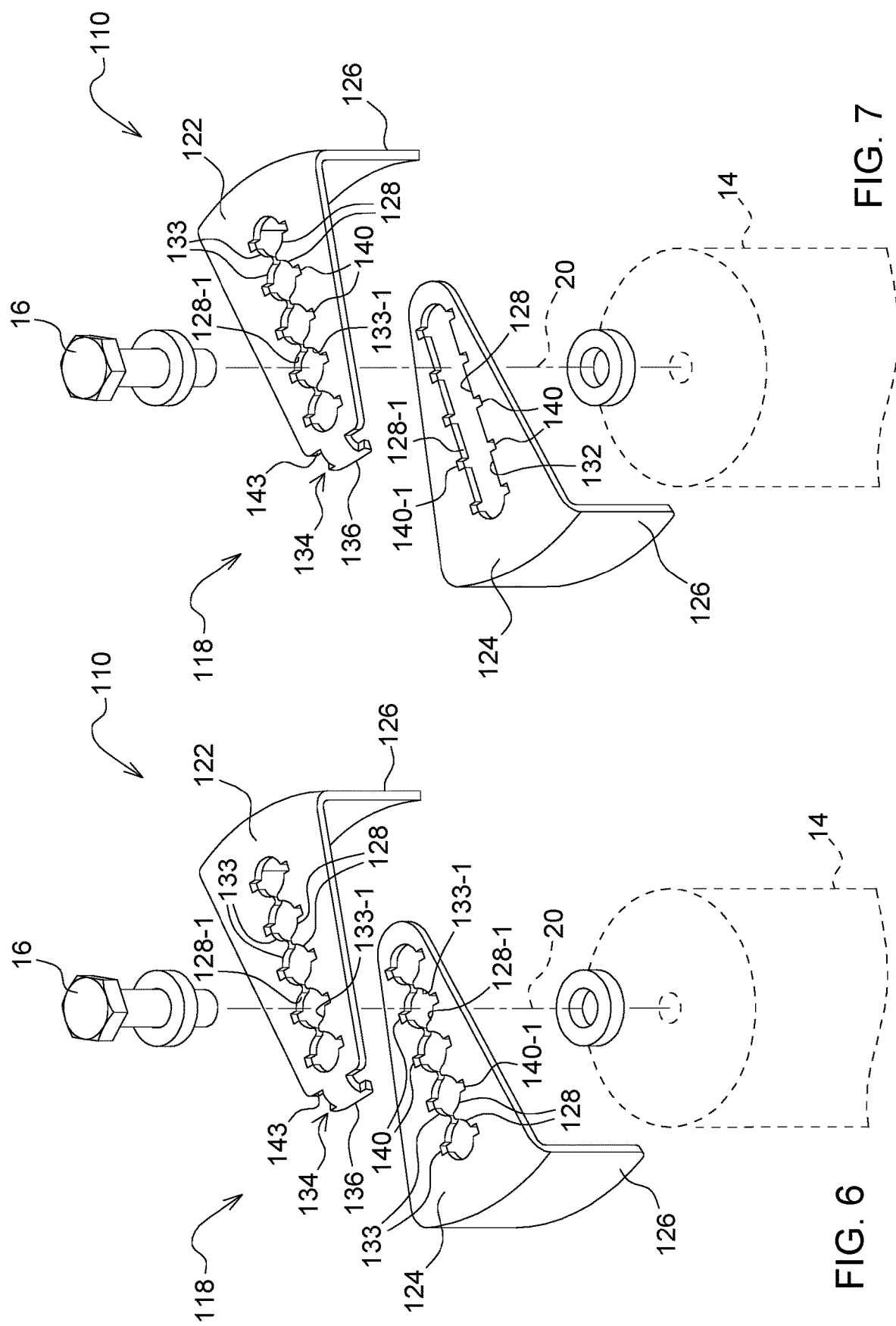

ROTARY MECHANISM WITH ADJUSTABLE TONE WHEEL

FIELD OF THE DISCLOSURE

The present disclosure relates to rotary mechanisms, in particular, to rotary mechanisms with a tone wheel.

BACKGROUND OF THE DISCLOSURE

A tone wheel is used to measure the rotational speed of a shaft. The tone wheel is mounted to the shaft for rotation therewith, and a sensor in proximity to the tone wheel senses one or more targets of the tone wheel to detect the rotational speed. A machine, such as an agricultural harvester, sometimes has several tone wheels onboard, the diameters of a number of which are different from one another and non-adjustable from manufacture.

SUMMARY OF THE DISCLOSURE

According to an aspect of the present disclosure, there is disclosed a rotary mechanism comprising a fastener and a tone wheel. The tone wheel comprises a first radial flange, a second radial flange, a first target, and a second target. The first and second targets are mounted respectively to the first and second radial flanges to be sensed by a sensor. Each of the first radial flange and the second radial flange comprises a plurality of mounting points, the plurality of mounting points of the first radial flange and the second radial flange provided for adjustment of a diameter of the tone wheel. The fastener is positioned at a selected mounting point among the plurality of mounting points of the first radial flange and at a selected mounting point among the plurality of mounting points of the second radial flange to mount the first radial flange and the second radial flange to the shaft at the selected mounting points to set the diameter of the tone wheel.

According to another aspect of the present disclosure, there is disclosed a method of assembling a rotary mechanism. The rotary mechanism comprises a tone wheel. The tone wheel comprises a first radial flange, a second radial flange, a first target, and a second target. The first and second targets are mounted respectively to the first and second radial flanges to be sensed by a sensor. The method comprises selecting a diameter for the tone wheel among a plurality of selectable diameters by adjusting the first and second radial flanges relative to one another to the selected diameter, and fastening the first and second radial flanges at the selected diameter to a shaft.

The above and other features will become apparent from the following description and accompanying drawings.

BRIEF DESCRIPTION OF THE DRAWINGS

The detailed description of the drawings refers to the accompanying figures in which:

FIG. 4 is a perspective view showing the first rotary mechanism with a reduced diameter;

FIG. 5 is a perspective view showing a second rotary mechanism;

FIG. 6 is an exploded perspective view showing the second rotary mechanism;

FIG. 7 is a perspective view showing an alternative embodiment of the second rotary mechanism;

DETAILED DESCRIPTION OF THE DRAWINGS

Figure 1:
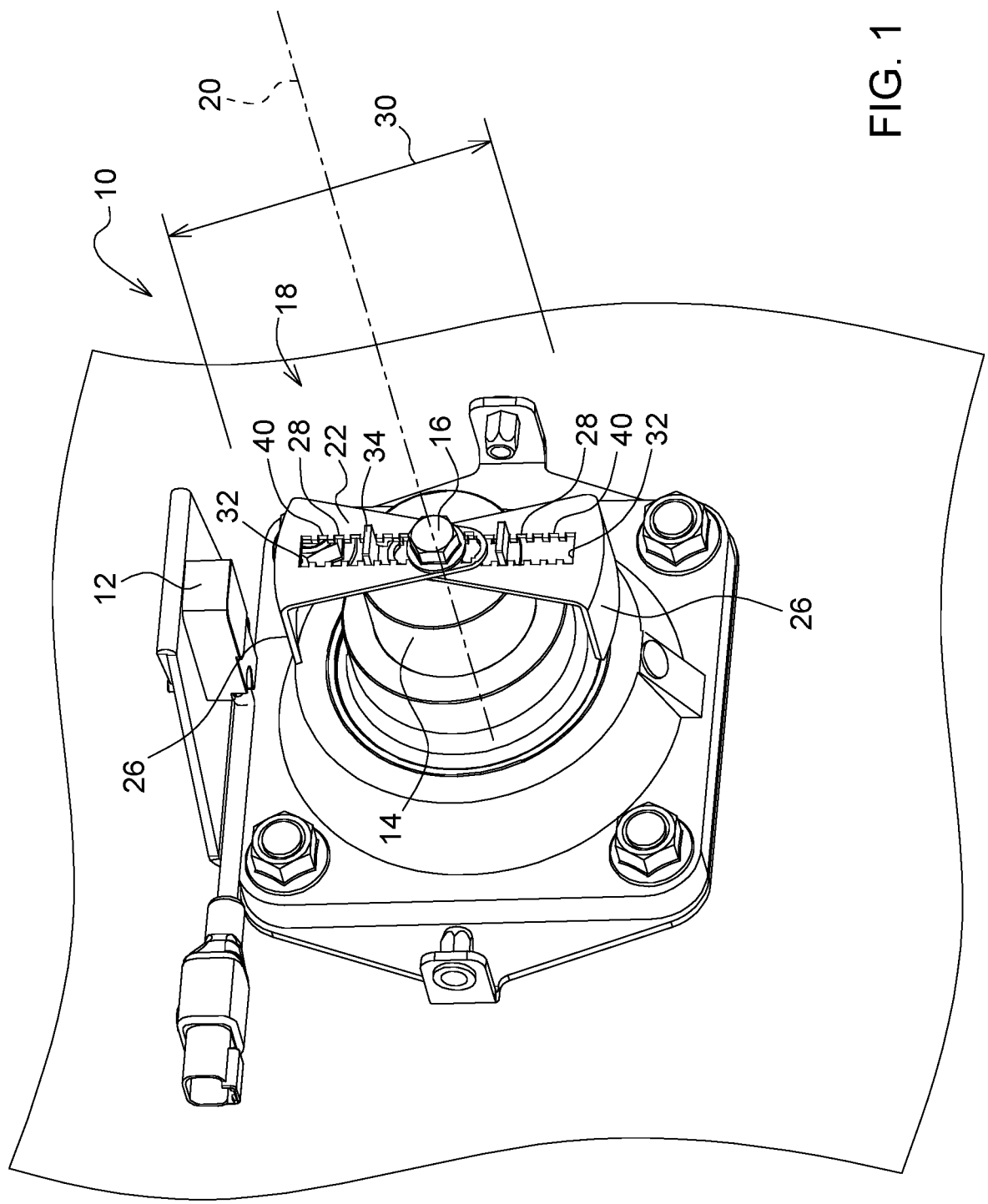
FIG. 1 is a perspective view showing a first rotary mechanism mounted to a shaft for determining a rotational speed of the shaft.

Referring to FIGS. 1-4, a first rotary mechanism 10 includes a sensor 12, a shaft 14, a fastener 16, and an adjustable tone wheel 18. The fastener 16 mounts the tone wheel 18 to the shaft 14 (e.g., to an end face of the shaft 14) for rotation with the shaft 14 about a rotation axis 20 of the shaft 14 and the tone wheel 18 at a rotational speed. The sensor 12 senses the rotational speed of the tone wheel 18 and thus of the shaft 14.

The tone wheel 18 includes a first radial flange 22, a second radial flange 24, a first target 26, and a second target 26. The radial flanges 22, 24 are mounted to the shaft 14 with the fastener 16 so as to be fixed to the shaft 14. The first and second targets 26 are mounted respectively to the first and second radial flanges 22, 24 to be sensed by the sensor 12. Each radial flange 22, 24 extends radially relative to the axis 20, and each target 26 extends axially from the respective radial flange 22, 24 relative to the axis 20. Each target 26 may be configured, for example, as a tab extending axially from a radially outer end portion of the respective radial flange 22, 24 relative to the axis 20 and integrated with that radial flange 22, 24 or, in other embodiments, distinct therefrom. It is to be appreciated that the tone wheel 18 may include two or more radial flanges and two or more targets mounted respectively thereto to be sensed by the sensor 12.

Each of the radial flanges 22, 24 includes a plurality of mounting points 28. The plurality of mounting points 28 of the radial flanges 22, 24 are provided for adjustment of a diameter 30 of the tone wheel 18. The first radial flange 22 and the second radial flange 24 are positioned in axially overlapping relation to one another relative to the rotation axis 20 of the tone wheel 18 with the fastener 16 positioned at a selected mounting point 28-1 among the plurality of mounting points 28 of each of the first radial flange 22 and the second radial flange 24 to mount the first radial flange 22 and the second radial flange 24 to the shaft 14 at the selected mounting points 28-1 to set the diameter 30 of the tone wheel 18.

The sensor 12 is positioned in proximity to the tone wheel 18 to sense the first and second targets 26. The sensor 12 may be any suitable sensor. For example, the sensor 12 may be any suitable proximity sensor (e.g., inductive sensor).

Each of the first radial flange 22 and the second radial flange 24 includes one or more apertures providing the plurality of mounting points 28 of that radial flange 22, 24. For example, the one or more apertures of the first radial flange 22 includes a first radial slot 32. The first radial slot 32 includes the plurality of mounting points 28 of the first radial flange 22. The one or more apertures of the second radial flange 24 includes a second radial slot 32. The second radial slot 32 includes the plurality of mounting points 28 of the second radial flange 24. Illustratively, the one or more apertures of each radial flange 22, 24 is configured, for example, as the respective radial slot 32. The fastener 16 extends through the first radial slot 32 at the selected mounting point 28-1 of the first radial slot 32 and through the second radial slot 32 at the selected mount point 28-1 of the second radial slot 32. The first radial flange 22 includes the first radial slot 32, and the second radial flange 24 includes the second radial slot 32.

The rotary mechanism 10 includes a flange retainer 34. The flange retainer 34 is attached to the first radial flange 22 and the second radial flange 24 to retain the first radial flange 22 and the second radial flange 24 in place relative to one another. The flange retainer 34 retains the first radial flange 22 and the second radial flange 24 angularly relative to one another about the rotation axis 20. The flange retainer 34 retains the first radial flange 22 and the second radial flange 24 radially relative to one another about the rotation axis 20.

Figure 3:
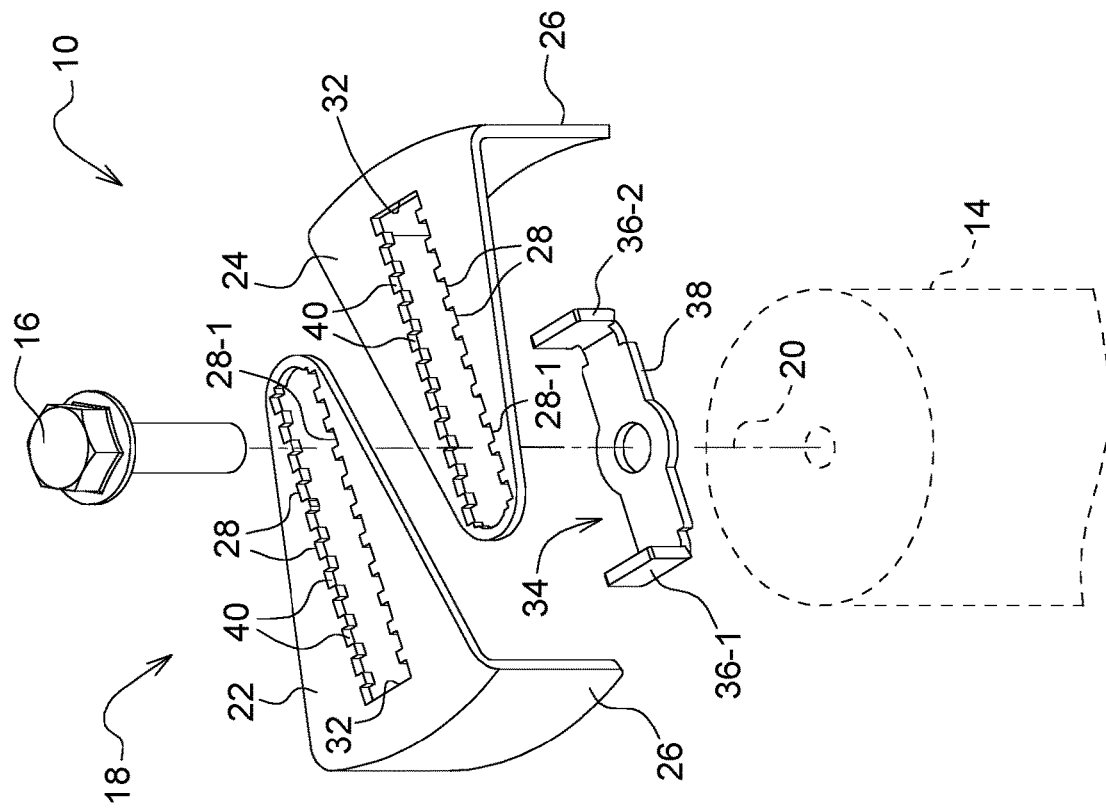
FIG. 3 is an exploded perspective view showing the first rotary mechanism.
Figure 2:
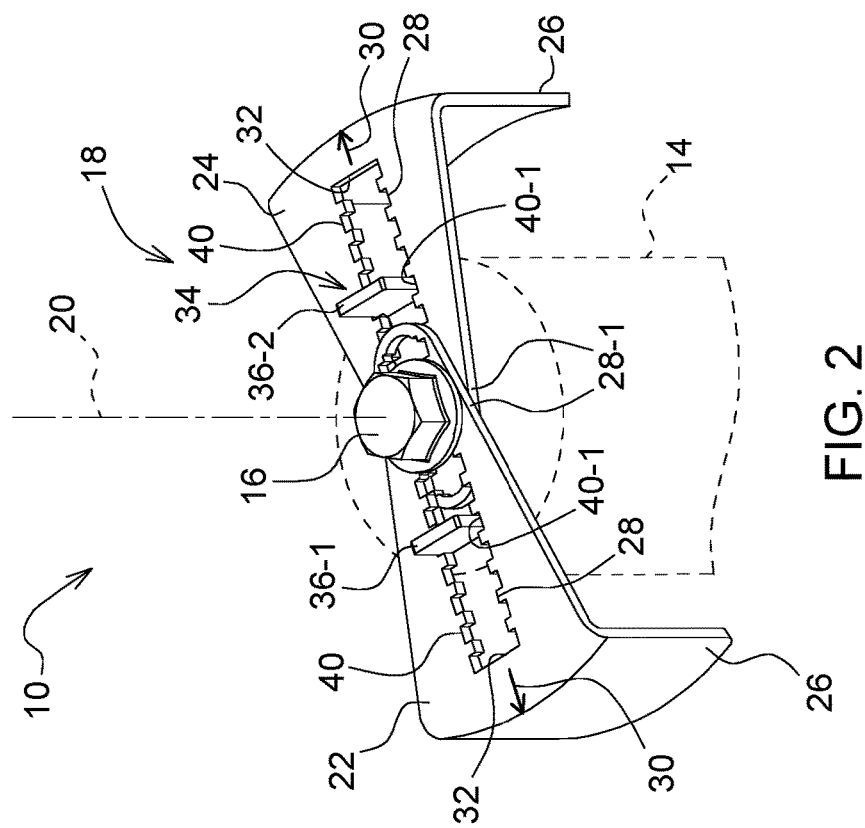
FIG. 2 is a perspective view showing the first rotary mechanism.

The flange retainer 34 is attached to the first radial slot 32 and the second radial slot 32. The flange retainer 34 includes a first tab 36-1, a second tab 36-2, and an elongated body 38 interconnecting the first tab 36-1 and the second tab 36-2 and through which the fastener 16 extends. The extent of overlap of the radial slots 32 depends on the diameter 30 of the tone wheel 18. With a larger diameter, there may be less overlap, in which case the first tab 36-1 may extend into and be attached to only the first radial slot 32, and the second tab 36-2 may extend into and be attached to only the second radial slot 32 (FIGS. 1-3). With a smaller diameter 30, there is more overlap, in which case, as illustrated, the first and second tabs 36-1, 36-2 may extend into and be attached to the first and second radial slots 32 (FIG. 4).

Each of the first radial slot 32 and the second radial slot 32 includes a plurality of notches 40. The plurality of notches 40 of each radial slot 32 includes, for example, a first notch 40-1 and a second notch 40-2. With a larger diameter 30, the first tab 36-1 is attached to the first notch 40-1 of the first radial slot 32, and the second tab 36-2 is attached to the first notch 40-1 of the second radial slot 32 (FIGS. 1-3). With a smaller diameter 30, the first tab 36-1 is attached to the first notch 40-1 of the first radial slot 32 and the second notch 40-2 of the second radial slot 32 on a first side 42 of the fastener 16 (FIG. 4). The second tab 36-2 is attached to the second notch 40-2 of the first radial slot 32 and the first notch 40-1 of the second radial slot 32 on a second side 44 of the fastener 16 opposite to the first side 42. With respect to the first radial flange 22, the first notch 40-1 is closer to the first target 26 than the second notch 40-2. With respect to the second radial flange 24, the first notch 40-1 is closer to the second target 26 than the second notch 40-2. Each notch 40 includes a pair of opposed indentations that receives the respective tab 36-1, 36-2 therein.

The diameter 30 of the tone wheel 18 can be adjusted for the application of the tone wheel 18. For example, the diameter 30 can be adjusted at the time of initial assembly, or, later, for example, in an assembly operation for a particular application or to fine tune operation of the tone wheel 18. In a method of assembly, the diameter 30 for the tone wheel 18 is selected among a plurality of selectable diameters by adjusting the first and second radial flanges 22, 24 relative to one another to the selected diameter 30, and the first and second radial flanges 22, 24 are fastened at the selected diameter 30 to the shaft 14 with the fastener 16. Selecting the diameter 30 includes adjusting the first radial flange 22 to a selected mounting point 28-1 among the plurality of mounting points 28 of the first radial flange 22 and the second radial flange 24 to a selected mounting point 28-1 among the plurality of mounting points 28 of the second radial flange 24, and the selected mounting points 28-1 of the first and second radial flanges 22, 24 are fastened to the shaft 14 with the fastener 16. The first and second radial flanges 22, 24 are retained relative to one another, such as angularly and radially relative to one another about the rotation axis 20. The flange retainer 34 may be used to do so.

The diameter 30 of the tone wheel 18 can be adjusted after initial assembly. The fastener 16 is loosened, and the flange retainer 34 is removed from the radial flanges 22, 24 by removal of the first and second tabs 36-1, 36-2 from the notches 40-1 and notches 40-2, as applicable. The radial flanges 22, 24 are adjusted relative to one another to lengthen or shorten the diameter 30 as desired. The flange retainer 34 is reattached to the radial flanges 22, 24 by attaching the tabs 36-1, 36-2 to other respective notches 40 of the radial flanges 22, 24, and the fastener 16 is retightened.

Referring to FIGS. 5-6, a second rotary mechanism 110 is similar to the rotary mechanism 10. The rotary mechanism 110 has an adjustable tone wheel 118 in place of the tone wheel 18.

The tone wheel 118 includes a first radial flange 122, a second radial flange 124, a first target 126, and a second target 126. The radial flanges 122, 124 are mounted to the shaft 14 with the fastener 16 so as to be fixed to the shaft 14. The first and second targets 126 are mounted respectively to the first and second radial flanges 122, 124 to be sensed by the sensor 12. Each radial flange 122, 124 extends radially relative to the axis 20, and each target 126 extends axially from the respective radial flange 122, 124 relative to the axis 20. Each target 126 may be configured, for example, as a tab extending axially from a radially outer end portion of the respective radial flange 122, 124 relative to the axis 20 and integrated with that radial flange 122, 124 or, in other embodiments, distinct therefrom. It is to be appreciated that the tone wheel 118 may include two or more radial flanges and two or more targets mounted respectively thereto to be sensed by the sensor 12.

Each of the radial flanges 122, 124 includes a plurality of mounting points 128. The plurality of mounting points 128 of the radial flanges 122, 124 are provided for adjustment of a diameter 130 of the tone wheel 118. The first radial flange 122 and the second radial flange 124 are positioned in axially overlapping relation to one another relative to the rotation axis 20 of the tone wheel 118 with the fastener 16 positioned at a selected mounting point 128-1 among the plurality of mounting points 128 of each of the first radial flange 122 and the second radial flange 124 to mount the first radial flange 122 and the second radial flange 124 to the shaft 14 at the selected mounting points 128-1 to set the diameter 130 of the tone wheel 18.

Each of the first radial flange 122 and the second radial flange 124 comprises a plurality of apertures 133 providing the plurality of mounting points 128 of that radial flange 122, 124. Each mounting point 128 is configured as a respective one of the apertures 133. The fastener 16 extends through an aperture 133-1 of the plurality of apertures 133 of the first radial flange 122 and an aperture 133-1 of the plurality of apertures 133 of the second radial flange 124. As such, each aperture 133-1 of the radial flanges 122, 124 provides a respective selected mounting point 128-1 of the radial flanges 122, 124.

The rotary mechanism 110 includes a flange retainer 134. The flange retainer 134 is attached to the first radial flange 122 and the second radial flange 124 to retain the first radial flange 122 and the second radial flange 124 in place relative to one another. The flange retainer 134 retains the first radial flange 122 and the second radial flange 124 angularly relative to one another about the rotation axis 20. The flange retainer 134 retains the first radial flange 122 and the second radial flange 124 radially relative to one another about the rotation axis 20.

The plurality of apertures 133 of the second radial flange 124 includes a plurality of notches 140. The flange retainer 134 includes a tab 136 mounted to the first radial flange 122. The tab 136 extends into and is attached to a notch 140-1 of the plurality of notches 140. Each notch 140 includes a pair of opposed indentations that receives the tab 136 therein. For the sake of manufacturing efficiency (e.g., reducing the number of parts), the plurality of apertures 133 of the first radial flange 122 may likewise include notches 140.

The tab 136 is mounted to an end portion 143 of the second radial flange 124 opposite to the second target 126. The tab 136 extends axially relative to the axis 20. The tab 136 is positioned on the first side 42 of the fastener 16, and the target 126 is positioned on the second side 44 of the fastener 16.

The tab 136 may be mounted to the end portion 143 in a wide variety of ways. For example, the tab 136 is integrated into the radial flange 124 with the tip of the end portion 143 bent to extend axially and provide the tab 136. In another example, the tab 136 may be welded to the end portion 143.

In another example of the second radial flange 124, shown, for example, in FIG. 7, the second radial flange 124 includes a radial slot 132 instead of the plurality of apertures 133. The radial slot 132 includes the mounting points 128 of the second radial flange 124. The fastener 16 extends through the aperture 133-1 of the plurality of apertures 133 of the first radial flange 12 and extends through the radial slot 132 of the second radial flange 124 at the selected mounting point 128-1 of the second radial flange 124. The flange retainer 134 is attached to the radial slot 132. The radial slot 132 includes the plurality of notches 140. The tab 136 extends into and is attached to the notch 140-1 of the notches 140.

The diameter 130 of the tone wheel 118 can be adjusted for the application of the tone wheel 118. For example, the diameter 130 can be adjusted at the time of initial assembly, or, later, for example, in an assembly operation for a particular application or to fine tune operation of the tone wheel 18. In a method of assembly, the diameter 130 is selected for the tone wheel 118 among a plurality of selectable diameters by adjusting the first and second radial flanges 122, 124 relative to one another to the selected diameter 130, and the first and second radial flanges 122, 124 are fastened at the selected diameter 130 to the shaft 14 with the fastener 16. Selecting the diameter 130 includes adjusting the first radial flange 122 to a selected mounting point 128-1 among the plurality of mounting points 128 of the first radial flange 122 and the second radial flange 124 to a selected mounting point 128-1 among the plurality of mounting points 128 of the second radial flange 124, and the selected mounting points 128-1 of the first and second radial flanges 122, 124 are fastened to the shaft 14 with the fastener 16. The first and second radial flanges 122, 124 are retained relative to one another, such as angularly and radially relative to one another about the rotation axis 20. The flange retainer 34 may be used to do so.

The diameter 130 of the tone wheel 118 can be adjusted after initial assembly. The fastener 16 is loosened, and the flange retainer 134 is removed from the second radial flange 124 by removal of the tab 136 from the notch 140-1. The radial flanges 122, 124 are adjusted relative to one another to lengthen or shorten the diameter 130 as desired. The flange retainer 134 is reattached to the second radial flange 124 by attaching the tab 136 to another notch 140 of the notches 140 of the second radial flange 124, and the fastener 16 is retightened.

Figure 9:
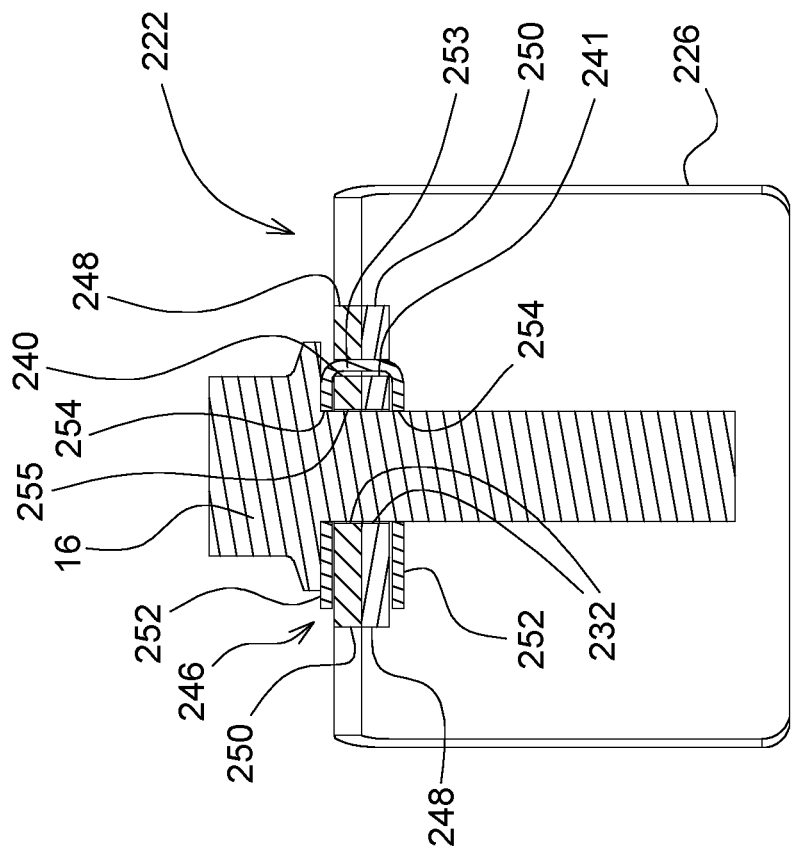
FIG. 9 is a sectional view, taken along lines 9-9 of FIG. 8.
Figure 8:
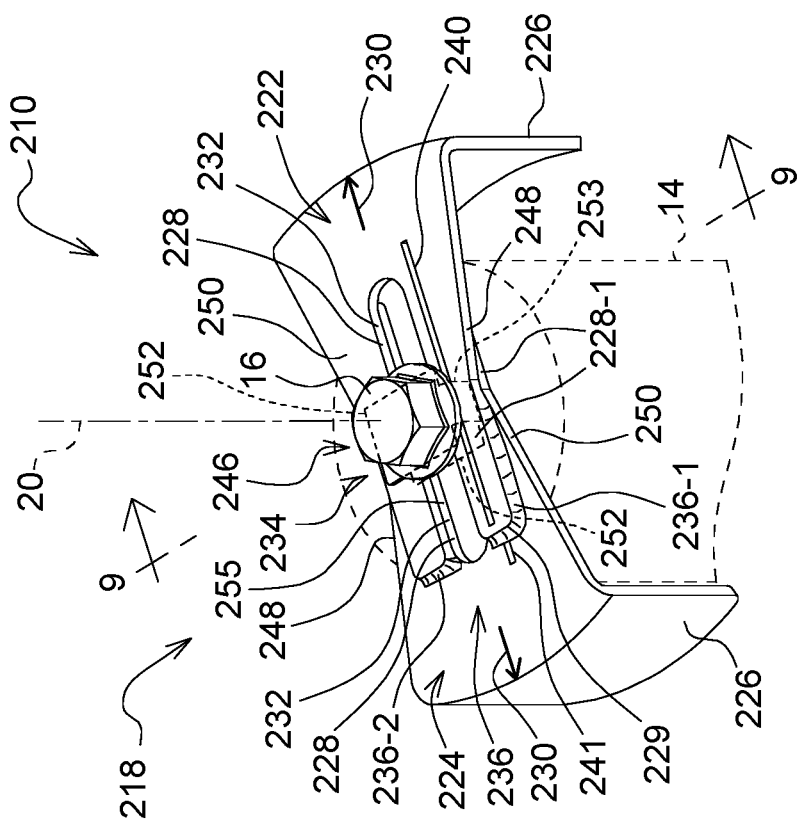
FIG. 8 is a perspective view showing a third rotary mechanism.
Figure 10:
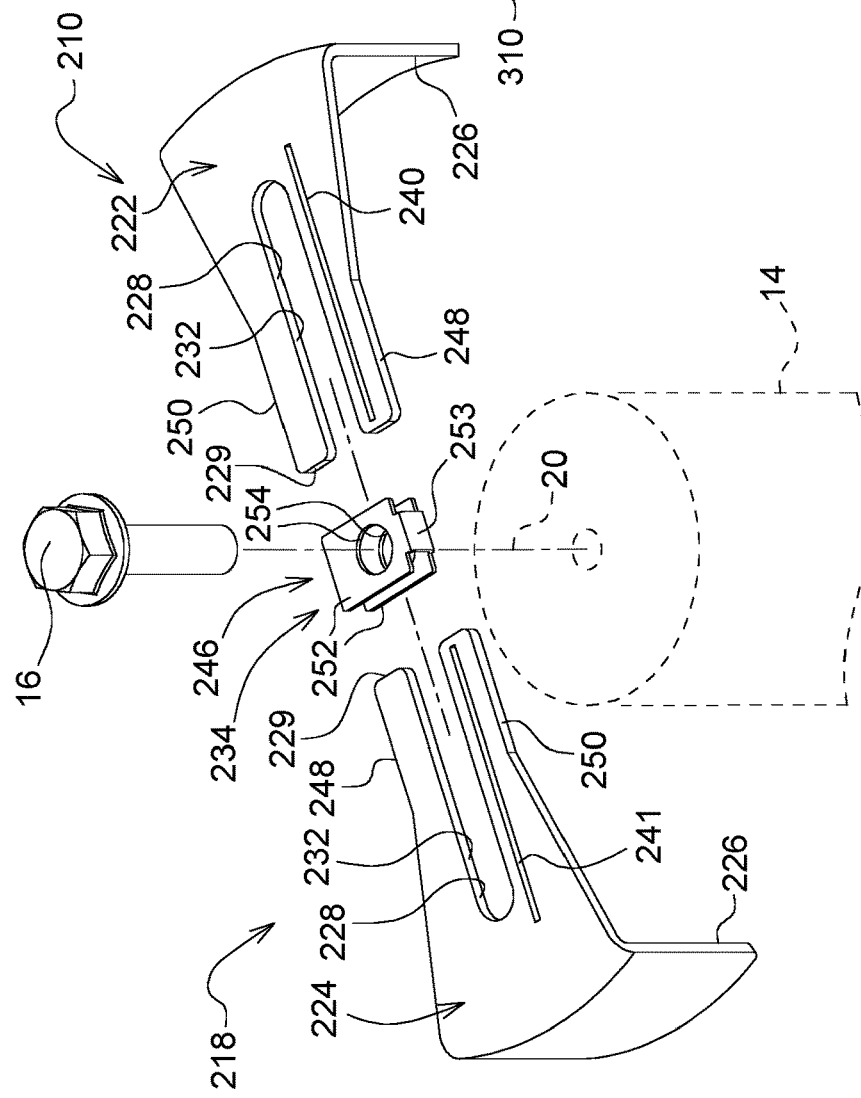
FIG. 10 is an exploded perspective view showing the third rotary mechanism.

Referring to FIGS. 8-10, a third rotary mechanism 210 is similar to the rotary mechanism 10. The rotary mechanism 210 has an adjustable tone wheel 218 in place of the tone wheel 18.

The tone wheel 218 includes a first radial flange 222, a second radial flange 224, a first target 226, and a second target 226. The radial flanges 222, 224 are mounted to the shaft 14 with the fastener 16 so as to be fixed to the shaft 14. The first and second targets 226 are mounted respectively to the first and second radial flanges 222, 224 to be sensed by the sensor 12. Each radial flange 222, 224 extends radially relative to the axis 20, and each target 226 extends axially from the respective radial flange 222, 224 relative to the axis 20. Each target 226 may be configured, for example, as a tab extending axially from a radially outer end portion of the respective radial flange 222, 224 relative to the axis 20 and integrated with that radial flange 222, 224 or, in other embodiments, distinct therefrom. It is to be appreciated that the tone wheel 218 may include two or more radial flanges and two or more targets mounted respectively thereto to be sensed by the sensor 12.

Each of the radial flanges 222, 224 includes a plurality of mounting points 228. The plurality of mounting points 228 of the radial flanges 222, 224 are provided for adjustment of a diameter 230 of the tone wheel 218. The first radial flange 222 and the second radial flange 224 are positioned in axially overlapping relation to one another relative to the rotation axis 20 of the tone wheel 218 with the fastener 16 positioned at a selected mounting point 228-1 among the plurality of mounting points 228 of each of the first radial flange 222 and the second radial flange 224 to mount the first radial flange 222 and the second radial flange 224 to the shaft 14 at the selected mounting points 228-1 to set the diameter 230 of the tone wheel 218.

Each of the first radial flange 222 and the second radial flange 224 includes one or more apertures providing the plurality of mounting points 228 of that radial flange 222, 224. For example, the one or more apertures includes a first radial slot 232. The first radial slot 232 includes the plurality of mounting points 228 of the first radial flange 222. The one or more apertures of the second radial flange 224 includes a second radial slot 232. The second radial slot 232 includes the plurality of mounting points 228 of the second radial flange 224. Illustratively, the one or more apertures of each radial flange 222, 224 is configured, for example, as the respective radial slot 232. The fastener 16 extends through the first radial slot 232 at the selected mounting point 228-1 of the first radial slot 232 and through the second radial slot 232 at the selected mount point 228-1 of the second radial slot 232. The first radial flange 222 includes the first radial slot 232, and the second radial flange 224 includes the second radial slot 232. Each of the first and second radial slots 232 is open at an open end 229 thereof opposite to the target 226, facilitating assembly of the tone wheel 218.

The rotary mechanism 210 includes a flange retainer 234. The flange retainer 234 is attached to the first radial flange 222 and the second radial flange 224 to retain the first radial flange 222 and the second radial flange 224 in place relative to one another. The flange retainer 234 retains the first radial flange 222 and the second radial flange 224 angularly relative to one another about the rotation axis 20. The flange retainer 234 retains the first radial flange 222 and the second radial flange 224 radially relative to one another about the rotation axis 20.

A first alignment slot 240 is included in the first radial flange 222, and a second alignment slot 241 is included in the second radial flange 224. The flange retainer 234 is attached to the first alignment slot 24 and the second alignment slot 241.

The flange retainer 234 includes a clip 246. The clip 246 is attached to the first alignment slot 240 included in the first radial flange 222 and the second alignment slot 241 included in the second radial flange 224. Each of the radial flanges 222, 224 includes a first finger 248 and a second finger 250. The first finger 248 of the first radial flange 222 includes the first alignment slot 240, and the second finger 250 of the second radial flange 224 includes the second alignment slot 241.

The clip 246 includes a first body 252, a second body 252, and a connector 253. The fastener 16 extends through an aperture 254 included in each of the first and second bodies 252. Each of the first and second bodies 252 is transverse to the first and second fingers 248, 250 of the first radial flange 222 such that the first body 252 extends from the first finger 248 of the first radial flange 222 to the second finger 250 of the first radial flange 222 and the second body 252 extends from the second finger 250 of the second radial flange 224 to the first finger 248 of the second radial flange 224. In so doing, the bodies 252 extend across a gap 255 between the first and second fingers 248, 250 of the radial flanges 222, 224, the first and second radials slots 232 cooperating to provide the gap 255. The connector 253 interconnects the first and second bodies 252, and extends axially through the first and second alignment slots 240, 241 relative to the axis 20 to retain the first and second radial flanges 222, 224 angularly relative to one another about the axis 20. Each of the bodies 252 may be configured, for example, as a perforated plate or other body configured for extension of the fastener 16 therethrough, and the connector is configured, for example, as a strap or other connector for interconnecting the bodies 252.

The flange retainer 234 includes a weld 236 that welds the first radial flange 222 and the second radial flange 224 to one another. The weld 236 includes a first weld bead 236-1 between an outer edge of the first finger 248 of the first radial flange 222 and a portion of an axially-facing surface of the second radial flange 224, which portion is included in the second finger 250 of the second radial flange 224. The weld 236 includes a second weld bead 236-2 between an outer edge of the second finger 250 of the first radial flange 222 and a portion of the axially-facing surface of the second radial flange 224, which portion is included in the first finger 248 of the second radial flange 224. The first and second radial flanges 222, 224 are welded to one another.

The diameter 230 of the tone wheel 218 can be adjusted for the application of the tone wheel 230. For example, the diameter 230 can be adjusted at the time of initial assembly. In a method of assembly, the diameter 230 for the tone wheel 218 is selected among a plurality of selectable diameters by adjusting the first and second radial flanges 222, 224 relative to one another to the selected diameter 230, and the first and second radial flanges 222, 224 are fastened at the selected diameter 230 to the shaft 14 with the fastener 16. Selecting the diameter 230 includes adjusting the first radial flange 222 to a selected mounting point 228-1 among the plurality of mounting points 228 of the first radial flange 222 and the second radial flange 224 to a selected mounting point 228-1 among the plurality of mounting points 228 of the second radial flange 224, and the selected mounting points 228-1 of the first and second radial flanges 222, 224 are fastened to the shaft 14 with the fastener 16. The first and second radial flanges 222, 224 are retained relative to one another, such as angularly and radially relative to one another about the rotation axis 20. The flange retainer 234 may be used to do so with the clip 246 and the weld 236. The adjustment of the diameter 230 can occur before the clip 246 is installed or after installation.

Figure 11:
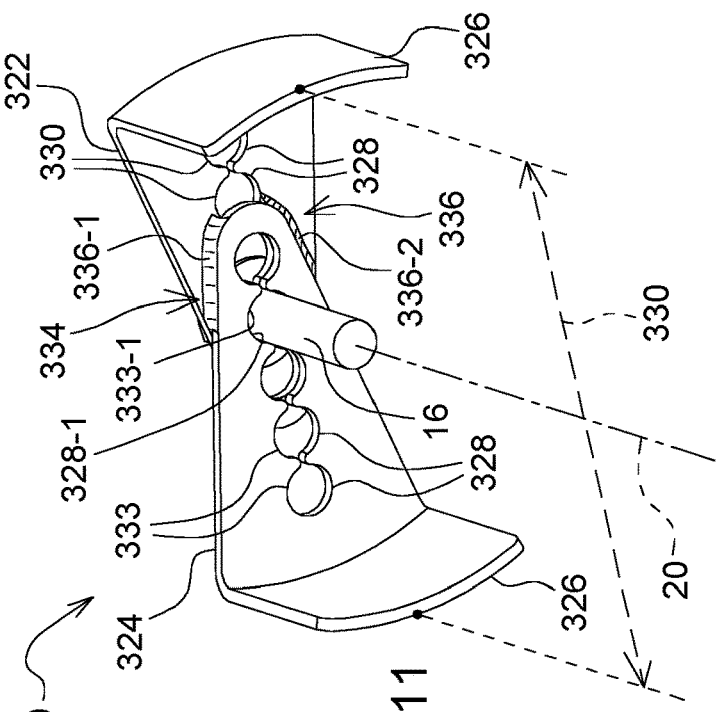
FIG. 11 is a perspective view showing a fourth rotary mechanism.

Referring to FIG. 11, a fourth rotary mechanism 310 is similar to the rotary mechanism 10. The rotary mechanism 310 has an adjustable tone wheel 318 in place of the tone wheel 18.

The tone wheel 18 includes a first radial flange 322, a second radial flange 324, a first target 326, and a second target 326. The radial flanges 322, 324 are mounted to the shaft 14 with the fastener 16 so as to be fixed to the shaft 14. The first and second targets 326 are mounted respectively to the first and second radial flanges 322, 324 to be sensed by the sensor 12. Each radial flange 322, 324 extends radially relative to the axis 20, and each target 326 extends axially from the respective radial flange 322, 324 relative to the axis 20. Each target 326 may be configured, for example, as a tab extending axially from a radially outer end portion of the respective radial flange 322, 324 relative to the axis 20 and integrated with that radial flange 322, 324 or, in other embodiments, distinct therefrom. It is to be appreciated that the tone wheel 318 may include two or more radial flanges and two or more targets mounted respectively thereto to be sensed by the sensor 12.

Each of the radial flanges 322, 324 includes a plurality of mounting points 328. The plurality of mounting points 328 of the radial flanges 322, 324 are provided for adjustment of a diameter 330 of the tone wheel 318. The first radial flange 322 and the second radial flange 324 are positioned in axially overlapping relation to one another relative to the rotation axis 20 of the tone wheel 318 with the fastener 16 positioned at a selected mounting point 328-1 among the plurality of mounting points 328 of each of the first radial flange 322 and the second radial flange 324 to mount the first radial flange 322 and the second radial flange 324 to the shaft 14 at the selected mounting points 328-1 to set the diameter 330 of the tone wheel 318.

Each of the first radial flange 322 and the second radial flange 324 comprises a plurality of apertures 333 providing the plurality of mounting points 328 of that radial flange 322, 324. Each mounting point 328 is configured as a respective one of the apertures 333. The fastener 16 extends through an aperture 333-1 of the plurality of apertures 333 of the first radial flange 322 and an aperture 333-1 of the plurality of apertures 333 of the second radial flange 324. As such, each aperture 333-1 of the radial flanges 322, 324 provides a respective selected mounting point 328-1 of the radial flanges 322, 324. The selected mounting points of the radial flanges 322, 324 are similar to one another, and the selected apertures 333-1 of the radial flanges 322, 324 are similar to one another.

The rotary mechanism 310 includes a flange retainer 334. The flange retainer 334 is attached to the first radial flange 322 and the second radial flange 324 to retain the first radial flange 322 and the second radial flange 324 in place relative to one another. The flange retainer 334 retains the first radial flange 322 and the second radial flange 324 angularly relative to one another about the rotation axis 20. The flange retainer 334 retains the first radial flange 322 and the second radial flange 324 radially relative to one another about the rotation axis 20.

The flange retainer 334 is configured, for example, as a weld 336 that welds the first radial flange 322 and the second radial flange 324 to one another. In such a case, the flange retainer 334 includes, for example, a first weld bead 336-1 between an axially-facing surface of the first radial flange 322 and a first side edge of the second radial flange 324, and a second weld bead 336-2 between the axially-facing surface of the first radial flange 322 and a second side edge of the second radial flange 324. The first and second radial flanges 322, 324 are welded to one another.

The diameter 330 of the tone wheel 318 can be adjusted for the application of the tone wheel 318. For example, the diameter 330 can be adjusted at the time of initial assembly. In a method of assembly, the diameter 330 for the tone wheel 318 is selected among a plurality of selectable diameters by adjusting the first and second radial flanges 322, 324 relative to one another to the selected diameter 330, and the first and second radial flanges 322, 324 are fastened at the selected diameter 330 to the shaft 14 with the fastener 16. Selecting the diameter 330 includes adjusting the first radial flange 322 to a selected mounting point 328-1 among the plurality of mounting points 328 of the first radial flange 322 and the second radial flange 324 to a selected mounting point 328-1 among the plurality of mounting points 328 of the second radial flange 324, and the selected mounting points 328-1 of the first and second radial flanges 322, 324 are fastened to the shaft 14 with the fastener 16. The first and second radial flanges 322, 324 are retained relative to one another, such as angularly and radially relative to one another about the rotation axis 20. The flange retainer 334 may be used to do so with the weld 336.

It is to be appreciated that the radial flanges 22, 24, 122, 124, 222, 224, 322, 324 can be stamped from sheet metal for ease of manufacture. The radial flanges 22, 24, 122, 124, 222, 224, 322, 324 can be reversed such that the targets 26, 126, 226, 326 extend in the axially opposite direction from what is depicted. The first flange 22, 122, 222, 322 and the second flange 24, 124, 224, 324 may be arranged in a manner other than in overlapping relation. For example, they may be configured so as to be positioned side-by-side, or so that one may straddle the other.

The fastener 16 may be configured as any suitable type of fastener. For example, the fastener 16 may include any suitable type of bolt, such as a flange bolt as shown, for example, in FIGS. 1-4 and 8-11, or a hex bolt with a pair of washers as shown, for example, in FIGS. 5-7. Although not shown for ease of illustration, it is to be appreciated that the bolts would have threads.

While the above describes example embodiments of the present disclosure, these descriptions should not be viewed in a limiting sense. Rather, other variations and modifications can be made without departing from the scope and spirit of the present disclosure as defined in the appended claims.

What is claimed is:

1. A rotary mechanism, comprising:
   a fastener,
   a tone wheel comprising a first radial flange, a second radial flange, a first target, and a second target, the first and second targets mounted respectively to the first and second radial flanges to be sensed by a sensor, each of the first radial flange and the second radial flange comprising a plurality of mounting points, the plurality of mounting points of the first radial flange and the second radial flange provided for adjustment of a diameter of the tone wheel, the fastener positioned at a selected mounting point among the plurality of mounting points of the first radial flange and at a selected mounting point among the plurality of mounting points of the second radial flange to mount the first radial flange and the second radial flange to a shaft at the selected mounting points to set the diameter of the tone wheel, and
   a flange retainer attached to the first radial flange and the second radial flange,
   wherein the second radial flange comprises one or more apertures providing the plurality of mounting points of the second radial flange, the one or more apertures of the second radial flange comprises a radial slot, and the flange retainer is attached to the radial slot,
   wherein the radial slot is a second radial slot, the first radial flange comprises one or more apertures providing the plurality of mounting points of the first radial flange, and the one or more apertures of the first radial flange comprises a first radial slot, and the flange retainer is attached to the first radial slot,
   wherein the flange retainer comprises a first tab attached to the first radial slot, a second tab attached to the second radial slot, and an elongated body interconnecting the first tab and the second tab and through which the fastener extends.

2. The rotary mechanism of claim 1, wherein each of the first radial slot and the second radial slot comprises a first notch and a second notch, with respect to the first radial flange the first notch is closer to the first target than the second notch, with respect to the second radial flange the first notch is closer to the second target than the second notch, the first tab is attached to the first notch of the first radial slot and the second notch of the second radial slot on a first side of the fastener, and the second tab is attached to the second notch of the first radial slot and the first notch of the second radial slot on a second side of the fastener opposite to the first side.

* * * * *